G. M. EATON.
DYNAMO ELECTRIC MACHINE.
APPLICATION FILED MAR. 3, 1914.
1,318,734.
Patented Oct. 14, 1919.
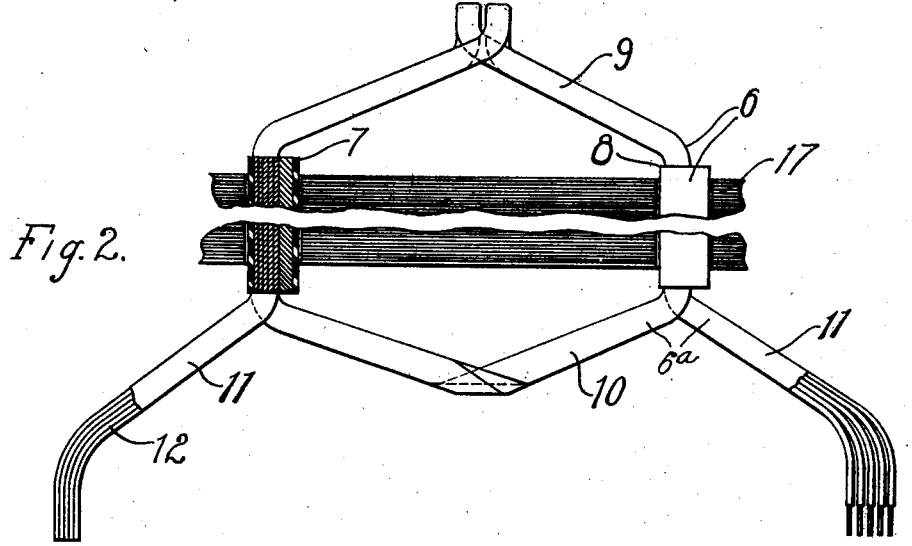
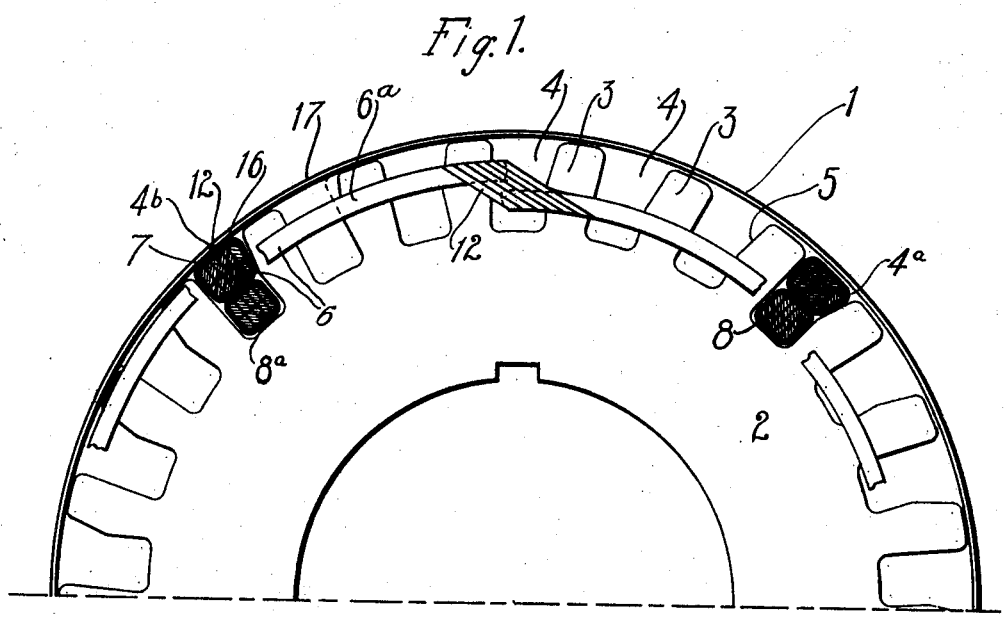
WITNESSES:
R. J. Fitzgerald
D. H. Mace
INVENTOR
George M. Eaton
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,318,734.     Specification of Letters Patent.     Patented Oct. 14, 1919.

Application filed March 3, 1914. Serial No. 822,203.

*To all whom it may concern:*

Be it known that I, GEORGE M. EATON, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines, and it has special reference to armature core structures and associated coil structures.

The object of my invention is to provide a structure of the above indicated class which shall permit of the ready assembly of armature coils, particularly of the form-wound type, and minimize the possibility of damaging the coils during the assembling operation, and also insure closeness of fit of the coils in the armature slots.

The usual method of assembling armature coils consists of placing the coils in the slots and then driving wedges of some form to retain the coils in the slots. Or, in case the winding is of the bar type, the strap conductors, themselves, may constitute the wedges. In either case, the driving of the wedging members longitudinally of the slots often damages the insulation of the coils.

According to my invention, I provide one side of the outer portion of each tooth with a surface that is inclined to the adjacent inner surface of the tooth, thus forming slots, the outer portions of which have sides that converge inwardly. A tapered wedge is preferably bound to one side of one of the straight portions of each coil and is enveloped in the insulating wrapper. With such a construction, the coil structure may be inserted radially and tightly positioned in its slot without driving in any wedging members and consequently with relatively little possibility of damage.

In the accompanying drawing, Figure 1 is a view, partially in section and partially in end elevation, of a portion of an armature core and portions of two coils constructed in accordance with my invention. Fig. 2 is a plan view of a portion of the structure shown in Fig. 1, and Fig. 3 is an enlarged view of a single armature slot and two coils, in section, disposed therein.

Referring to the drawing, an armature 1 embodies a magnetizable core 2 preferably composed of punchings or laminations assembled side-by-side in the ordinary manner. The core 2 is provided with a plurality of teeth 3 separated by slots 4. In general, the sides of each tooth are approximately radial and the sides of each slot approximately parallel. An inclined surface 5 is provided on one side of the outer portion of each tooth whereby a slot is produced that is wider at its periphery than its base, and, moreover, the outer portion of the slot has sides that converge inwardly, for a purpose to be hereinafter pointed out.

An armature coil structure 6, which is representative of all of a plurality of coils constituting the armature winding, comprises a coil $6^a$ and a wedge member 13 and is shown disposed in its operative position. The coil $6^a$ embodies two substantially parallel straight portions 7 and 8, opposite end portions 9 and 10 and leads 11. The coil $6^a$ is composed of a plurality of convolutions 12 of a strap conductor which are disposed side-by-side and are individually insulated from one another.

The wedge 13 of suitable material is placed adjacent to one side 14 of the straight portion 7 of the coil $6^a$, with its thicker edge at the periphery, and, preferably, the coil and the wedge member are bound together by a suitable insulating wrapper 16.

Assuming that the core 2 and coil $6^a$ have the characteristics hereinbefore set forth, and that member $8^a$ constitutes one of the straight portions of another coil which has already been placed in position, the coil $6^a$ is placed in position as follows: The straight portion 8 is first forced into the lower portion of its proper slot $4^a$, during which operation the convergent upper sides of the slot serve to assist in gradually squeezing the coil insulation against the conductor and effecting a tight fit of the coil in the bottom of the slot. Subsequently, the straight portion 7 of the coil, to which the wedge is attached, is forced down into the upper portion of slot $4^b$ until it rests upon the straight portion $8^a$ of the previously positioned coil. No difficulty will be experienced in positioning this portion of the coil, as no stretching will be required, because of the inclined surface 5 of the adjoining tooth and the absence of any sharp corners. The wedge 13 of the coil structure 6 serves to insure a tight fit. The coils $6^a$, including the wedges 13, when assembled, project slightly above the core 2 but are drawn down into the slots and thus further tightened by suitable banding wires 17, in the usual manner.

My invention is susceptible of various modifications, and I desire it to be understood that it is not to be limited to any particular structural details and arrangement of parts except as specified in the appended claims.

I claim as my invention:

1. The combination with a core member provided with a plurality of slots, of an armature coil comprising parallel side members, a wedge member extending longitudinally of one of said side members and adapted to cause a wedging action between the coil and the slot sides, and insulating material enveloping said armature coil and said wedge member.

2. The combination with a magnetizable core provided with a plurality of slots, the outer portion of one side of each of which is inclined at an angle to the inner portion thereof, of a plurality of coils each having a pair of substantially parallel straight portions adapted to be disposed in a pair of spaced slots, and a wedge secured in one of the said straight portions of each coil to engage the corresponding inclined slot surface.

3. The combination with a magnetizable core provided with a plurality of slots and teeth, the slots being of greater width at the periphery than at the base, of a plurality of coils severally embodying a pair of straight portions respectively adapted to be disposed in the inner and in the outer portions of spaced slots, and wedging members secured to the coil portions that are disposed in the outer portions of the slots to engage the adjacent sides thereof.

4. The combination with a magnetizable core provided with a plurality of slots and teeth, the slots being wider at the periphery than at the bases of the teeth, of a plurality of armature coils each having straight portions respectively adapted to be disposed in the upper and lower portions of different slots, a wedge member disposed adjacent to one side of one straight portion of each coil, and a layer of insulation enveloping said member and the adjacent straight portion of said coil.

5. The combination with a magnetizable core provided with a plurality of slots and teeth, the slots being wider at the periphery than at the bases of the teeth, of a plurality of coils severally embodying a pair of active straight portions, a wedge disposed adjacent to one side of one of the straight portions of each coil, and an envelop of insulating material surrounding each wedge and the adjacent straight coil portion, the straight portion and its associated wedge being disposed in the outer portion of one of the slots.

In testimony whereof, I have hereunto subscribed my name this 27th day of Feb., 1914.

GEORGE M. EATON.

Witnesses:
G. R. IRWIN,
B. B. HINES.

Copies of this patent may be obtained for five cents each, by addressing the "Commissioner of Patents, Washington, D. C."